3,298,927
PROCESS FOR PREPARING 6-DEMETHYLTETRA-CYCLINES USING ETHIONINE SULFOXIDE
Saul L. Neidleman, Highland Park, N.J., assignor to Olin Mathieson Chemical Corporation, New York, N.Y., a corporation of Virginia
No Drawing. Filed Nov. 9, 1964, Ser. No. 409,945
2 Claims. (Cl. 195—80)

This application is a continuation-in-part of a prior filed application, Serial No. 65,928, filed October 31, 1960, now United States Patent No. 3,172,822.

This invention relates to an improved process for the production of 7-chloro-6-demethyltetracycline and, more particularly, to an improvement in the process of producing 7-chloro-6-demethyltetracycline by culturing 7-chlorotetracycline-producing strains of Streptomyces.

Prior to the present invention, 7-chloro-6-demethyltetracycline has been produced by culturing selected mutant strains of S. aureofaciens in contact with nutrient media of varying compositions. The antibiotic thus produced is characterized by extreme chemical stability, notably in strong acid and alkali solutions, and by its increased retention in the circulatory system of man. Hence, the therapeutic importance of the 7-chloro-6-demethyltetracycline is unquestionable. It is, therefore, desirable that the simplest and most effective procedures for the production of this antibiotic be provided. This means, of course, that it is highly desirable to achieve the production of 7-chloro-6-demethyltetracycline with a minimum of restriction on the source of microorganism which can be employed and without the burden of selecting particular strains of microorganisms for use in the fermentation process for producing 7-chloro-6-demethyltetracycline.

It has been found in accordance with the present invention that 7-chloro-6-demethyltetracycline can be produced in good yield from any 7-chlorotetracycline-producing strain of Streptomyces when ethionine sulfoxide is added to a growing culture of a 7-chlorotetracycline-producing strain of Streptomyces.

Among the tetracycline producing strains of Streptomyces which have been successfully employed in the preparation of 7-chloro-6-demethyltetracycline by the novel process of the present invention are the following: S. aureofaciens ATCC 13899; S. aureofaciens ATCC 12416a; S. aureofaciens ATCC 12416b; S. aureofaciens ATCC 12416c; S. aureofaciens NRRL B 1288; S. aureofaciens NRRL 2209; S. aureofaciens NRRL B 1286; S. aureofaciens NRRL B 1287; and S. viridofaciens ATCC 11989.

The fermentation procedure employed in the novel process of the present invention may be carried out in accordance with the conditions generally employed in the production of tetracycline. Thus, the nutrient medium, conditions of time, temperature and pH control, aeration, and the like will conform to those employed in the production of tetracycline as set out in U.S. Patent No. 2,734,018.

When a fermentation medium low in biologically available chloride, that is, a medium containing only such chloride as is normally present as a constituent of one of the components of the medium, is employed, variable amounts of tetracycline and 7-chlorotetracycline will form in addition to the desired 7-chloro-6-demethyltetracycline.

If a source of biologically available chloride is included in the fermentation medium, then 7-chlorotetracycline will form to the near exclusion of tetracycline.

The following example is illustrative of the practice of this invention:

*Example 1*

A culture of Streptomyces aureofaciens (ATCC 13900) is grown in approximately 50 ml. of an aqueous medium containing, per 1000 ml., 30 gms. extraction process soybean meal, 50 gms. glucose and 7 gm. calcium carbonate in a 250 ml. Erlenmeyer flask. The flask is agitated on a rotary shaker (280 cycles per minute) in a room maintained at 25° C. for a period of 72 hours. 10% of the resulting inoculum is then transferred to a 250 ml. Erlenmeyer flask containing 50 ml. of the medium employed above and the flask agitated a further 72 hours under the same conditions. 1 ml. of the resulting inoculum is then employed for the inoculation of 10 ml. of an aqueous medium containing, per 1000 ml., 30 gms. extraction process soybean meal, 50 gms. glucose and 7 gms. calcium carbonate, in a 1″ x 6″ test tube. 1 ml. of a sterile solution of DL-ethionine sulfoxide containing 1 mg./ml. is added to the tube and the tube is shaken at 280 cycles per minute at 25° C. for seven days. The contents of the tube were then acidified to pH 2 by the addition of sulfuric acid and centrifuged. Examination of the supernatant liqiud by paper chromatography employing the methods of Bohonos et al. Antibiotics Annual 1953–4, page 49) demonstrates the presence of 7-chloro - 6 - demethyltetracycline, 7-chlorotetracycline and tetracycline.

What is claimed is:
1. A process for the production of 7-chloro-6-demethyltetracycline which comprises cultivating a chlorotetracycline-producing strain of Streptomyces in an aqueous nutrient medium, said medium being low in biologically available chloride ions, under areobic conditions in the presence of a small but effective amount of ethionine sulfoxide.
2. The process of claim 1 in which the ethionine sulfoxide compound is DL-ethionine sulfoxide.

References Cited by the Examiner
UNITED STATES PATENTS

| | | | |
|---|---|---|---|
| 2,878,289 | 3/1959 | McCormick et al. | 195—80 |
| 3,190,810 | 6/1965 | Miller et al. | 195—80 |

A. LOUIS MONACELL, *Primary Examiner.*
D. M. STEPHENS, *Assistant Examiner.*